United States Patent
Scandurra et al.

(10) Patent No.: US 6,704,821 B2
(45) Date of Patent: Mar. 9, 2004

(54) ARBITRATION METHOD AND CIRCUIT ARCHITECTURE THEREFORE

(75) Inventors: Alberto Scandurra, Messina (IT); Salvatore Pisasale, Catania (IT)

(73) Assignee: STMicroelectronics S.r.l., Agrate Brianza (IT)

(*) Notice: Subject to any disclaimer, the term of this patent is extended or adjusted under 35 U.S.C. 154(b) by 96 days.

(21) Appl. No.: 09/898,528

(22) Filed: Jul. 3, 2001

(65) Prior Publication Data

US 2002/0069310 A1 Jun. 6, 2002

(30) Foreign Application Priority Data

Jul. 5, 2000 (EP) .............................. 00114384

(51) Int. Cl.$^7$ .............................................. G06F 13/14
(52) U.S. Cl. ...................................... 710/243; 710/116
(58) Field of Search .............................. 710/240, 243, 710/113, 115, 116, 41, 43

(56) References Cited

U.S. PATENT DOCUMENTS

| | | |
|---|---|---|
| 5,241,632 A | 8/1993 | O'Connell et al. |
| 5,392,033 A | 2/1995 | Oman et al. .............. 340/825.5 |
| 5,481,680 A * | 1/1996 | Larson et al. ................ 710/113 |
| 5,546,548 A | 8/1996 | Chen et al. |
| 5,884,051 A * | 3/1999 | Schaffer et al. ............. 710/116 |
| 5,931,931 A * | 8/1999 | Nguyen ....................... 710/113 |
| 5,956,493 A | 9/1999 | Hewitt et al. |
| 6,266,718 B1 * | 7/2001 | Klein ........................... 710/58 |

\* cited by examiner

*Primary Examiner*—Glenn A. Auve
(74) *Attorney, Agent, or Firm*—Lisa K. Jorgenson; Robert Iannucci; Seed IP Law Group PLLC

(57) ABSTRACT

An interconnect system includes an arbitration unit for arbitration among a plurality of sources or initiators requesting access to resources or targets. The arbitration unit selectively grants the initiators access to the targets as a function of respective priorities. The system includes a programmable control unit for programmably choosing the priorities in question out of group of at least two different priority schemes including a positional fixed priority, programmed fixed priority, and a variable priority based on a respective threshold latency values associated to the initiators.

28 Claims, 2 Drawing Sheets

ARBITRATION METHOD AND CIRCUIT ARCHITECTURE THEREFORE

BACKGROUND OF THE INVENTION

1. Filed of the Invention

The present invention relates to arbitration in complex systems, such as digital systems.

2. Description of the Related Art

A complex digital system is comprised of a number of devices which need to access other devices, such as memories, peripherals, and more. Accesses take place through proper routing networks (datapath) through which data flow. Current terminology defines sources or initiators the devices accessing the further devices, and resources or targets the devices accessed by the former.

Accesses to the different resources must be in some way controlled to ensure that each initiator may achieve possession of the buses, and then to be able to perform data transfers toward the proper resource, for the required time.

A system whose task is to allow the various initiators to access the required targets, following a well defined logic, is called interconnect, and its core is called arbiter, since its task is to perform an arbitration between the requests coming from the initiators which require to transmit their data over the buses.

Arbitration is necessarily performed following some priority scheme, because when more than one initiator require at the same time possession of the buses, the arbiter must know which one of them must be served at that time.

The problem of arbitrating simultaneous requests of access to resources so as to ensure the required performance in terms of bandwidth and latency to the traffic sources of the system has already been studied and a number of solutions have been found.

In U.S. Pat. No. 5,956,493 a solution is disclosed implemented by using a bus arbiter including programmable latency counters to dynamically vary arbitration priority. The bus arbiter includes a request detection unit for detecting bus request signals of a plurality of bus masters, and a grant generator for generating corresponding grant signals to indicate a grant of ownership of the bus. A set of counters referred to as "request latency" counters is further provided wherein a separate counter unit corresponds to each bus master. Each counter is configured to generate a latency signal or value indicative of the time lapsed since the peripheral requested ownership of the bus. An arbitration control unit is coupled to the request latency counters, the request detection unit and the grant generator for processing incoming bus request signals. The arbitration control unit is configured to dynamically vary the level of arbitration priority given to each peripheral device based upon the latency signal corresponding to the device. Accordingly, as the time interval lapsed since a peripheral device requests the bus increases, the level of arbitration priority given to that peripheral also increases. A set of programmable registers are provided to allow software programming of the initial count value associated with each request latency counter. The request latency counter for a particular device may further be held or inhibited from counting to provide a constant level of priority for that particular peripheral device.

Since the level of arbitration priority given to a peripheral device may be based upon the span of time the peripheral has been waiting to gain ownership of the bus, improved overall system performance may be obtained, particularly for real time processing environments.

BRIEF SUMMARY OF THE INVENTION

An embodiment of the present invention provides an improved solution for interconnect arbitration, including a method and circuit architecture.

The arbitration strategy of an embodiment of the invention is a programmable one, that is one enabling proper decision as to the algorithm to be followed by the arbiter to grant the requests asserted by the initiators. Basically, the possibility exists of programming the priorities of the initiators, including the possibility of changing them dynamically.

The possible priority schemes are the following:

positional fixed priority;

programmed fixed priority; and variable priority based on the concept of latency.

This latter scheme can follow two different strategies if more than one initiator have reached their threshold (typically maximum) accepted latency value.

Depending on the traffic requirements of the system for each of its initiators, arbitration can be programmed by selectively and alternatively choosing one of at least two (and preferably all) of said schemes so as to ensure the best system performance.

Specifically, arbitration can follow one of the schemes described in the following:

positional fixed priority without latency check: initiators priorities are fixed, given by connectivity, and no latency check is performed; grant is always given to the highest priority initiator making a request;

programmed fixed priority without latency check: initiators priorities are fixed, given by the values stored in priority registers, and no latency check is performed; grant is always given to the highest priority initiator making a request;

fixed priority with latency check (first version): initiators priorities can dynamically change depending on the latency an initiator reaches; when two or more initiators reach their maximum accepted latency, the initiator having the highest priority will be granted; and fixed priority with latency check (second version): initiators priorities can dynamically change depending on the latency an initiator reaches; when two or more initiators reach their maximum accepted latency, the initiator having reached it first will be granted.

A preferred embodiment of the invention allows one to choose among four different criteria, and ensures a quite low grant delay, namely initiators are granted in a relatively small time within a clock cycle. This last property is principally due to the arbitration logic which uses the priority values stored in registers to take its decisions.

A significant feature of the invention is however programmability. The possibility to change runtime the arbitration scheme in terms of initiator priorities, latency requirements and priorities dynamic change management allows the system to easily meet the specifications in terms of initiators data rates (band-width) and latencies.

A significant preferred feature is the Latency Management Unit block, introducing a feature which in some cases could be very important to ensure performance and avoid deadlock: the possibility to grant, among the initiators having been kept waiting for the maximum tolerated time, the one having reached this maximum accepted latency first. This ensures that the "history" of the system is remembered by the arbiter while taking the decision of what initiator is to be granted, thus ensuring a more uniform distribution in time of the grants to all initiators.

In prior art solutions no timing information is available and priority and latency are linked (the higher the latency, the lower the priority). Latency count starts once the request is asserted and what happens if more initiators asserting requests have the same priority is left unclear.

Conversely, in an embodiment of the invention, very fast grant generation (e.g., <3 ns for eleven initiators in HCMOS7) is possible. Priority and latency are independent. As latency count does not depend on the request when more initiators reach maximum latency, grant can be given the one having reached it first (depending on arbitration programming).

An embodiment of the invention finds application in systems in which the devices accessing memories and resources in general are present in a high number, while the traffic generated is very high and could lead to congestion of the system.

Systems having similar features are generally those devoted to graphical processing, such as digital still cameras. In these system a number of image processing blocks can access with high traffic rates the only resource of the system, an SDRAM.

In a such situation it is very useful to have programmable arbitration algorithm, allowing software programming of priorities and maximum latencies for the various traffic sources so as to meet the bandwidth requirements based on the traffic generated for a given operation mode of the system.

Moreover, this approach is useful also when, at the beginning of implementation, no accurate data about traffic requirements are available; in this case implementing a well defined arbitration algorithm may not be satisfactory as this could not ensure requirements to be met.

BRIEF DESCRIPTION OF THE SEVERAL VIEWS OF THE DRAWINGS

The invention will now be described, by way of example only, with reference to the annexed drawings, wherein.

DETAILED DESCRIPTION OF THE INVENTION

Figure 1:
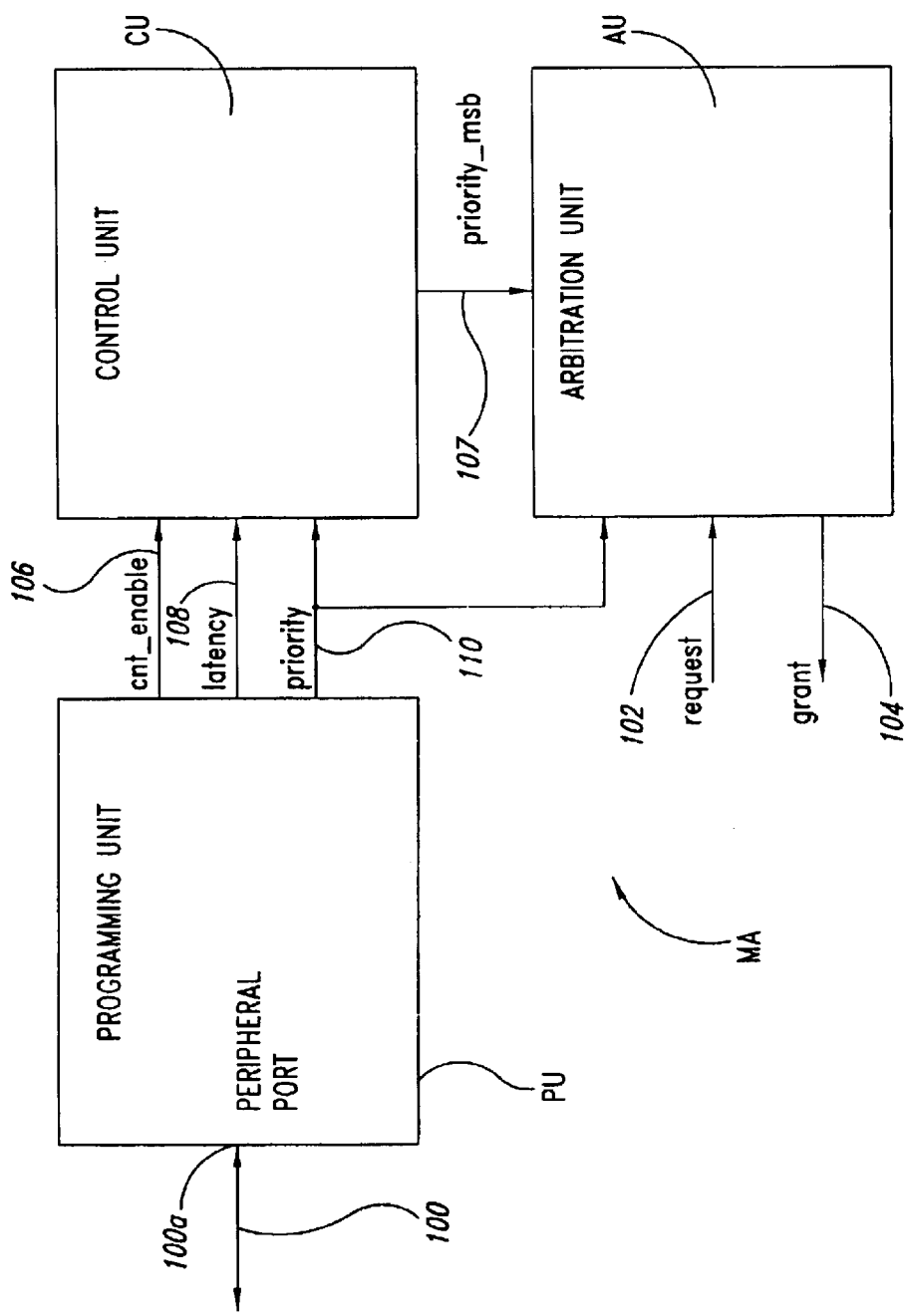
FIG. 1 is a block diagram showing the general layout of a memory arbiter scheme according to the invention.

As already indicated in the foregoing, the proposed arbitration scheme of the invention is a programmable scheme, in the sense that it is possible to choose the arbitration scheme to be followed by the arbiter to grant the initiators.

Basically, the priorities of the initiators on which the arbitration strategy is based are programmed through a proper programming port, allowing access to a number of interconnect internal registers, as better described in the following. Moreover, it is also possible to program the maximum accepted latencies for each initiator, that is to say the maximum number of clock cycles an initiator can wait with the request asserted but without receiving the grant.

Depending on the values stored in the interconnect registers, arbitration will be performed in such a way to meet as much as possible the system requirements in terms of bandwidth and latency.

In the presently preferred embodiment of the invention, the arbitration algorithms to choose from are at least two, and preferably all of the following:

positional fixed priority: each initiator has a fixed priority depending on the connection of the initiator itself to the interconnect system;

programmed fixed priority: each initiator has a fixed priority depending on the value stored in its own priority register;

variable priority based on the concept of latency: each initiator has a given priority depending on the value stored in its own priority register, but its value can rise if the initiator has been waiting for the grant more than a certain number of clock cycles. If more than one initiator have reached their maximum latency, the one having the highest fixed priority will be granted; and variable priority based on the concept of latency: each initiator has a given priority depending on the value stored in its own priority register, but its value can rise if the initiator has been waiting for the grant more than a certain number of clock cycles. If more than one initiator have reached their maximum latency, the one having reached it first will be granted first.

As indicated, an embodiment of the invention can be applied to any system of known type (not shown as a whole) including an interconnect subsystem, namely the memory arbiter MA.

In a preferred embodiment of the invention, arbiter MA is composed of three main blocks, namely a programming unit PU, an arbitration unit AU and a control unit CU.

Programming unit PU is basically an interface with the external world, following a simple RG (Request/Grant) protocol, allowing a system master, generally the system CPU, to access via a bidirectional line 100 and a respective peripheral port 100*a* the interconnect internal registers to write and read them so as to properly program the arbitration scheme to follow during operation. Consequently, a specific description of programming unit PU will not be provided here.

The core of the memory arbiter is the arbitration unit AU; it deals with the requests coming from the initiators and performs the arbitration, granting only one request among all the active requests.

Arbitration unit AU arbitrates the requests received on a line 102 according to the priorities defined by properly programming the right interconnect registers. Arbitration unit AU is very simple in its structure as its basic role is simply to take a decision on which of the requests has to be granted, grant orders being issued on a line 104.

Consequently, the specific implementation details of arbitration unit AU are not of interest for the instant invention, which is focused on the programmability of arbitration rather then on the way arbitration is performed. In general terms, arbitration is performed by means of a combinatorial block which generates grant signals based on the priority values stored in the interconnect registers.

If initiator priorities are equal, arbitration unit AU will consider initiators in order of connections, so to give them different priorities in any case. So, for example, if a system has n initiators whose requests are connected to an array of wires whose elements are numbered from 0 to n−1, initiator 0 will be considered as having the highest priority, initiator n−1 will be considered as having the lowest priority, and so on for the others.

So if the priority registers are programmed to have all the same value, priority will be positional, and arbiter MA will grant initiators depending on their connectivity. On the other hand, if priority registers are programmed in such a way that they have different values, priority will be given by these values themselves, and arbitration will be based on them.

As already indicated, arbitration can be based not only on the programmed initiators' priorities, but also on a check on the initiators' latencies to ensure a given bandwidth.

Control unit CU has the task of delivering to arbitration unit AU on a line 107 the initiator priorities. These include the priorities Most Significant Bit, which is an additional bit asserted when the number of cycles an initiator can wait without receiving the grant has elapsed. In this way initiator priority switches to the highest one and that initiator becomes a candidate to be granted in the next cycle.

Figure 2:
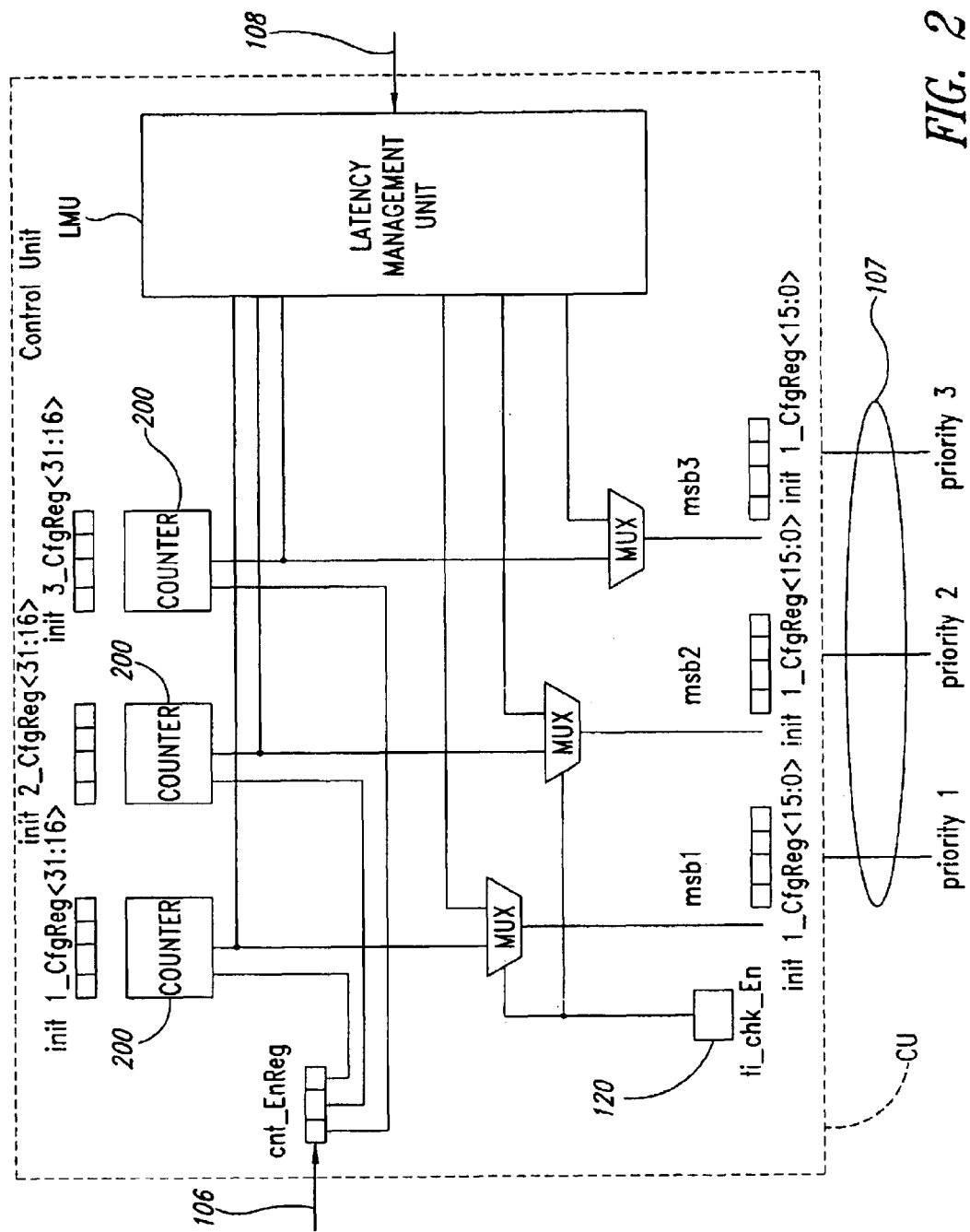
FIG. 2 is another block diagram showing the microarchitecture of the control unit in a system according to the invention.

To perform a check on initiator latencies, a counter is provided for each initiator (see subblocks counters 200 of FIG. 2), which is incremented cycle after cycle by a respective signal provided by programming unit PU on a channel 106 until the respective maximum accepted latency is reached. This threshold value is provided by programming unit PU on a channel 108.

Those skilled in the art will immediately appreciate that the term "channel", as used herein, is generally intended to include any sort of means permitting transmission of information, and that channels 102, 104 etc . . . are generally comprised of a plurality of lines arranged to permit simultaneous transmission of data pertaining to different initiators/targets.

When an initiator has waited the maximum accepted time, its priority becomes the highest one because the counter reaches its maximum value and asserts high its output representing, as already said, the most significant bit of priority. That initiator will thus be granted in any case, even if the highest priority initiator is asking for the buses.

If more than one lower priority initiators have been kept waiting for the maximum accepted time, the initiator to receive grant will depend on the setting of a particular interconnect one-bit register 120, designated ti_chkEnReg.

Basically if this register is reset (set low) the arbiter will grant the initiator with the highest fixed priority given by priority registers, while if this register is set (set high) the arbiter will grant the initiator having reached its maximum latency first. A proper setting of this register, and the a proper choice of the arbitration algorithm, can allow the system to meet the requirements in the best way.

If the register ti_chkEnReg is set high, the task to trace the history of the reaching of the maximum latencies for the initiators is performed by subblock LMM (Latency Management Unit). This contains a logic adapted for processing information about the initiators reaching the maximum latency in temporal order.

Block LMM has the task of keeping track of the temporal sequence of the setting of the counters' outputs. To do this a number of different approaches can be followed.

A first one is based on a FIFO (First In First Out) principle. Basically, in order to track the temporal sequence of the setting of the counter outputs, this block has an internal queue, into which the patterns of the counter outputs are stored when different from the previous ones. To be more precise, a brief example is given in the following.

The pattern of counter outputs, namely the priorities most significant bits for each initiators, is an input for the block, while the first element of the FIFO, namely the current configuration of the priorities Most Significant Bits for each initiator, is an output.

At the beginning of operation of the system, the FIFO will be empty, namely every elements of the FIFO will contain the pattern "00000000000". If at a given cycle initiator 0 reaches its maximum latency, the input pattern of the block will be "00000000001", and this will be stored in the first position of the FIFO.

Assuming that initiator 0 is not granted, and in a following cycle initiator 1 reaches its maximum latency as well, the input pattern will be now "00000000011", and the value "00000000010" will be stored in the second position of the FIFO.

This mechanism ensures that the initiator reaching its maximum latency first will be seen by the arbiter as having the highest priority first.

The process continues indefinitely. When the initiator corresponding to the pattern stored in the first position of the FIFO is granted in correspondence of the completion of a burst transfer (no matter the burst length) this element will be popped and the elements of the FIFO will be shifted, i.e., the second element will become the first one, and so on.

What happens if more than one initiator reach their maximum latency in the same cycle will now be described.

If at a given cycle the input pattern "00000000001" is present and at the next cycle the input pattern "00010000101" is present, the pattern "00010000100" will be stored in the queue. At this point, when this latter pattern becomes the first element in the FIFO (and then the output of the block) and one of the two specified initiators is granted, it will not be popped from the FIFO (this is because the other initiator is still waiting for its grant), but rather it will be simply masked. For example, if initiator 0 is granted, the new pattern stored in the first position of the FIFO will be "00010000000", and the FIFO elements will not be shifted.

What happens if an initiator already stored in the queue is granted and after a while reaches its maximum latency again will now be described.

The behavior of the block will be the following: if the pattern input sequence is "00000000001", "00000000011", "00000000010", "00000000011", . . . ; the elements stored in the FIFO will be respectively "00000000001", "00000000010", "00000000001", . . . and so on.

This should ensure the minimum waiting time between two subsequent grants; the mechanism of latency check must ensure that a given initiator must be granted at least once every n cycles, but it can be granted even more.

If the initiator corresponding to the pattern stored at the top of the FIFO is never granted because it does not submit any requests, the arbitration will follow the fixed priority algorithm.

In practice this condition will not occur in real cases, because the interconnect programming is strongly dependent on the real traffic expected for the various operation modes of the system.

As already indicated, management of latency can be effected in different ways. The implementation described here is just one of the possible ways to do it.

The memory controller MA has a number of memory mapped registers used to configure the system to follow a given arbitration scheme. Their number depends on the number of initiators the system is comprised of, and is equal to N+2, N being the number of initiators.

The memory mapped registers are used to set the initiators priorities and their maximum accepted latency (to be sent to control unit CU over lines 108, 110), namely the maximum number of clock cycles each initiator can wait without being granted, and to enable or disable some arbitration rules. Registers programming is usually carried out by a master such as the CPU at the beginning of operation. Access to the registers is achieved through interconnect peripheral port 100*a*.

The registers in question are preferably 32-bits registers, with the initiator priority stored in their low 16-bits word, while the initiator maximum latency is stored in the high 16-bits word.

Table 1 herein reports the interconnect programmable registers, pointing out their addresses, their names, and the meaning of the values stored into them.

TABLE 1

| Address | Name | Function |
| --- | --- | --- |
| Base + 0 | init1_CfgReg | Initiator 1 priority and maximum latency |
| Base + 4 | init2_CfgReg | Initiator 2 priority and maximum latency |
| ... | ... | ... |
| Base + 4*(N − 1) | initN_CfgReg | Initiator N priority and maximum latency |
| Base + 4*(N − 1) + 1 | cnt_EnReg | The bits set high enable the respective initiators latency counters, the reset ones disable latency counters |
| Base + 4*(N − 1) + 2 | ti_chkEnReg | If bit 0 is set high, the check on which initiator reaches first the maximum latency is done |

Table 2 which follows shows the contents of any of the first N registers associated with the N system initiators. Since the maximum number of active initiators (namely the initiators which can make requests at the same time) equals N, priorities are progressively numbered from 0 to N−1, so the number of bits needed to encode priorities depends on the value N. To encode initiator latency we instead need a number of bits depending on the maximum value chosen for latency.

TABLE 2

| initx_Cfg Reg | Base + 4*(x − 1) | | |
| --- | --- | --- | --- |
| Bit | Bit field | Reset state | Function |
| 15:0 | priority | User defined | Initiator priority |
| 31:16 | maximum latency | User defined | Maximum number of clock cycles an initiator can wait for grant after it made a request |

Table 3 shows the content of the (N+1)th register, containing as many flags as the number of initiators of the system; when set high, each flag enables the relative latency counter, when reset low it disable its relative counter.

TABLE 3

| cnt_En Reg | Base + 4*(N − 1) + 1 | | |
| --- | --- | --- | --- |
| Bit | Bit field | Reset state | Function |
| N−1:0 | counter enable | User defined | latency counters enabling |
| 31:N | reserved | — | not used |

Conversely, Table 4 shows the content of the Last register. The only bit having a function is the bit 0; when set, it means a check on which initiator reaches first the maximum accepted latency is done.

Basically when this bit is set, if two or more initiators have reached their maximum accepted latencies, the one having reached it first will be granted; otherwise, if this bit is reset, no time check is performed and the initiator being granted will be the one having higher priority.

TABLE 4

| ti_chkEn Reg | Base + 4*(N − 1) + 2 | | |
| --- | --- | --- | --- |
| Bit | Bit field | Reset state | Function |
| 0 | latency time check enable | 0 | Latency time check enabling |
| 31:1 | reserved | — | not used |

What happens when trying to write or read unused bits of registers depends on the implementation of the system based on specific requirements.

Preferably, when trying to access an address not corresponding to any register, the interconnect will grant the request in any case, but the data will be lost for writes, while no data will be returned for reads. Moreover, trying to write reserved bits of registers, the correspondent information will be lost as well. It is a task for the CPU to generate acceptable addresses and to write only the correct bits.

Naturally, specific details of embodiments may be varied without departing from the scope of the invention as defined by the annexed claims. This concerns, inter alia, the possibility of incorporating to the present invention the arbitration scheme disclosed in co-pending European Application No. 00830424.8, which is incorporated herein by reference.

What is claimed is:

1. A method of arbitration among a plurality of initiators requesting access to targets, the method comprising selectively granting access of said initiators to said targets as a function of respective priorities by an interconnect system including an arbitration unit, wherein said priorities are programmably chosen out of a group of at least two different priority schemes, wherein said group includes a variable priority scheme based on respective threshold latency values associated with said initiators and at least two different variable priority schemes are provided to be followed alternatively if more than one initiator have reached their threshold latency value.

2. The method of claim 1, wherein said group further includes the following priority schemes:

positional fixed priority, and programmed fixed priority.

3. The method of claim 2, wherein, in said positional fixed priority scheme, each initiator has a fixed priority depending on a connection of the initiator itself to the interconnect system.

4. The method of claim 2, wherein, in said programmed fixed priority scheme, each initiator has a fixed priority depending on a respective stored priority value.

5. The method of claim 1, wherein, in said variable priority scheme, said respective threshold latency value for each initiator is defined as a function of the maximum number of clock cycles said initiator can wait with a respective request asserted but without receiving the grant.

6. The method of claim 1, wherein, if more than one initiator have reached their threshold latency value, the one having the highest fixed priority is granted access.

7. The method of claim 1, wherein, if more than more initiator have reached their threshold latency value, the one having reached said threshold value first is granted access.

8. The method of claim 1, wherein, in said variable priority scheme, each initiator has a given priority depending on a respective stored value, said value being increased if the initiator has been waiting for grant more than a certain number of clock cycles.

9. An interconnect system architecture, comprising:
an arbitration unit for arbitration among a plurality of initiators requesting access to targets, said arbitration unit selectively granting said initiators access to said targets as a function of respective priorities;
a programmable control unit for programmably choosing said priorities out of a group of at least two different priority schemes; and
a number of memory mapped registers to configure the architecture to follow a given arbitration scheme.

10. The architecture of claim 9, wherein said group is comprised of the following priority schemes:
positional fixed priority;
programmed fixed priority; and
variable priority based on respective threshold latency values associated to said initiators.

11. The architecture of claim 10, wherein, in said positional fixed priority scheme, each initiator has a fixed priority depending on a connection of the initiator itself to the interconnect system.

12. The architecture of claim 10, wherein, in said programmed fixed priority scheme, each initiator has a fixed priority depending on a value stored in a proper priority register.

13. The architecture of claim 10, wherein, in said variable priority scheme, said respective threshold latency value for each initiator is defined as a function of the maximum number of clock cycles said initiator can wait with a respective request asserted but without receiving the grant.

14. The architecture of claim 10, wherein in said variable priority scheme each initiator has a given priority depending on a value stored in a respective priority counter, said value increasing if the initiator has been waiting for grant more than a certain number of clock cycles.

15. The architecture of claim 9, wherein the number of said registers is a function of the number of initiators in the system, being preferably equal to N+2, N being the number of initiators.

16. The architecture of claim 9, wherein said registers set the initiator priorities and their threshold latency values to selectively enable or disable said arbitration schemes.

17. The architecture of claim 16, further comprising a master to program said registers at a beginning of system operation.

18. The architecture of claim 9, wherein access to said registers is performed through an interconnect peripheral port.

19. The architecture of claim 9, wherein said registers include a first word for storing the initiator priority as well as a second word for storing the initiator threshold latency value.

20. An interconnect system architecture, comprising:
an arbitration unit for arbitration among a plurality of initiators requesting access to targets, said arbitration unit selectively granting said initiators access to said targets as a function of respective priorities; and
a programmable control unit for programmably choosing said priorities out of a group of at least two different priority schemes, wherein said group includes a variable priority scheme based on respective threshold latency values associated with said initiators and said interconnect system is arranged to adopt alternatively at least two different variable priority schemes if more than one initiator have reached their threshold latency values.

21. The architecture of claim 20, wherein said interconnect system is arranged to grant access to the initiator having the highest fixed priority if more than one initiator have reached their threshold latency values.

22. The architecture of claim 20, wherein said interconnect system is arranged to grant access to the initiator having reached its threshold value first if more than one initiator have reached their threshold latency values.

23. An interconnect system architecture, comprising:
an arbitration unit for arbitration among a plurality of initiators requesting access to targets, said arbitration unit selectively granting said initiators access to said targets as a function of respective priorities;
a programmable control unit for programmable choosing said priorities out of a group of at least two different priority schemes, wherein said group includes a variable priority scheme based on respective threshold latency values associated with said initiators, wherein in said variable priority scheme each initiator has a given priority depending on a value stored in a respective priority counter, said value increasing if the initiator has been waiting for grant more than a certain number of clock cycles; and
a block for tracking a temporal sequence of setting of outputs of said counters.

24. The architecture of claim 23, wherein said block has an internal FIFO queue, where patterns of said counter outputs are stored when different from previous ones.

25. The architecture of claim 24, wherein within said patterns of counter outputs, a most significant bit of the priority value for each initiator is an input for said block, while a first element of the FIFO queue, namely a current configuration of the priorities for the initiators is an output.

26. An interconnect system architecture, comprising:
an arbitration unit for arbitration among a plurality of initiators requesting access to a target, the arbitration unit selectively granting the initiators access to the target as a function of respective priorities; and
a programmable control unit coupled to the arbitration unit, the control unit including:
a plurality of latency counters each associated with a respective one of the initiators, each latency counter being structured to determine how long the initiator associated with the latency counter is waiting for an access request to be granted by the arbitration unit and to provide the arbitration unit with a priority override signal when a maximum latency value is reached by the counter;
a latency disabling unit coupled to the latency counters and structured to selectively enable and disable the latency counters;
a latency management unit coupled to the counters and structured to track an order in which the counters reach the maximum latency value and control the priority granted to the initiators based on the order; and
a latency control unit structured to selectively enable the latency management unit to control the priority granted to the initiators and alternately prevent the latency management unit from controlling the priority granted depending on how the latency control unit is programmed.

27. The architecture of claim 26, wherein the control unit includes a plurality of priority registers each associated with a respective one of the initiators, each priority register storing a priority value for the initiator associated with the priority register, wherein the arbitration unit is structure to arbitrate between requests from the initiators based on the priority values stored in the priority registers.

28. The architecture of claim 26, further comprising a programming unit coupled to the control unit and structured to program the latency disabling unit and thereby determine whether the latency disabling unit enables or disables the latency counters.

* * * * *